United States Patent [19]

Boote et al.

[11] Patent Number: 4,648,011
[45] Date of Patent: Mar. 3, 1987

[54] ILLUMINATED VANITY MIRROR PACKAGE FOR A VISOR

[75] Inventors: Carey J. Boote, Holland; Craig Robbins, Grand Haven; Scott A. Spykerman, Holland, all of Mich.

[73] Assignee: Prince Corporation, Holland, Mich.

[21] Appl. No.: 754,400

[22] Filed: Jul. 12, 1985

[51] Int. Cl.$^4$ ............................................. F21V 33/00
[52] U.S. Cl. .................................... 362/135; 362/144; 296/97 H
[58] Field of Search ............... 362/144, 135, 140, 141, 362/142, 137, 240; 296/97 H

[56] References Cited

U.S. PATENT DOCUMENTS 4,075,468  2/1978  Marcus ................................ 362/144
4,479,172  10/1984  Connor ............................... 362/135
4,518,192  5/1985  Canadas et al. ..................... 296/97 H

FOREIGN PATENT DOCUMENTS 53663    6/1982  European Pat. Off. .......... 296/97 H
099454   5/1983  Fed. Rep. of Germany .
2429685  1/1980  France .

Primary Examiner—James C. Yeung
Attorney, Agent, or Firm—Price, Heneveld, Cooper, DeWitt & Litton

[57] ABSTRACT

An insertable mirror package for a visor which includes at least one panel defining a mirror frame and integrally including a lateral extension which defines at least in part guide means for a sliding cover extending and movable in a plane parallel to and in front of the mirror for selective movement between a first position covering the mirror and a second position uncovering the mirror. In the preferred embodiment, lamps are positioned behind lenses mounted adjacent the mirror in the mirror frame and a switch is mounted to cooperate with a cam on the cover such that as the cover is moved to an open position, the lamps are illuminated to provide illumination for the mirror for use in low, ambient light.

14 Claims, 11 Drawing Figures

ILLUMINATED VANITY MIRROR PACKAGE FOR A VISOR

BACKGROUND OF THE INVENTION

The present invention relates to a covered vanity mirror package for an automotive visor.

Visors having illuminated and covered vanity mirrors have become an increasingly popular vehicle accessory with many vehicles including one or more such visors of the type shown in U.S. Pat. No. 4,227,241 included as standard or optional equipment. The present invention provides a visor with an illuminated vanity mirror with many of the advantages of the illuminated vanity mirror structure disclosed in U.S. Pat. No. 4,227,241 in an economical and compact alternative to such construction.

SUMMARY OF THE PRESENT INVENTION

The present invention includes an insertable mirror package for a visor which can be inserted into a pocket in the visor body and held in place without additional fasteners. The package may include illumination means for the mirror including a lens on one or both sides of the mirror for directing illumination in a focused manner from a side adjacent the mirror.

In one embodiment of the invention, the insert mirror package includes at least one panel defining a mirror frame and integrally including a lateral extension which defines at least in part guide means for a sliding cover extending and movable in a plane parallel to and in front of the mirror for selective movement between a first position covering the mirror and a second position uncovering the mirror. In the preferred embodiment, lamp means are positioned behind lenses mounted adjacent the mirror in the mirror frame and switch means are mounted to cooperate with a cam on the cover such that as the cover is moved to an open position, the lamps are illuminated to provide illumination for the mirror for use in low, ambient light.

In a preferred embodiment of the invention, the mirror frame is comprised of a pair of snap fitted panels with the sliding mirror cover interposed between the panels during assembly. The lateral extension of the mirror frame provides smooth guided support for the cover in its movement between a closed and open position and cooperates with the recess in the visor body for snugly holding the package within the visor body without separate fastening means. The resultant structure provides an economical illuminated vanity mirror insert package with a sliding cover which is compact and can be used in relatively small visor bodies and which is relatively inexpensive to manufacture.

These and other features, objects and advantages of the invention will become apparent upon reading the following description thereof, together with reference to the accompanying drawings in which:

DETAILED DESCRIPTION OF THE PREFERRED EMBODIMENT

Figure 1:
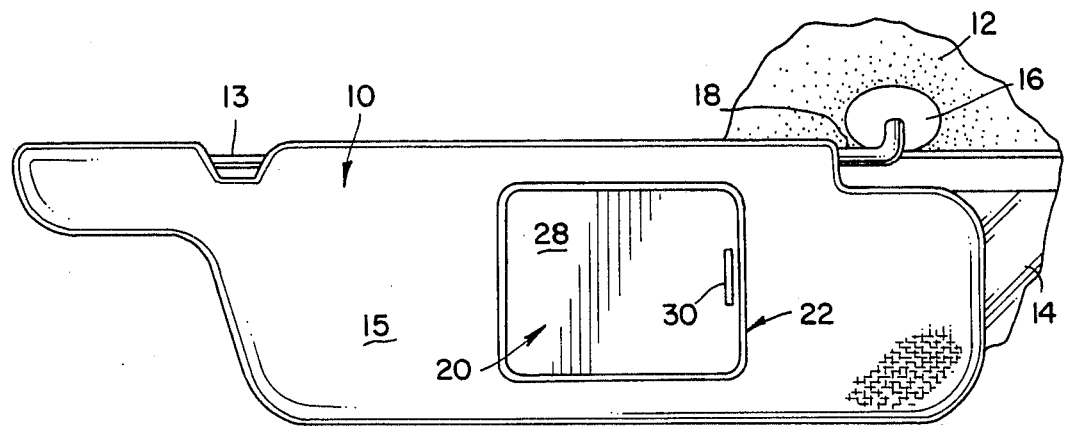
FIG. 1 is a front elevational view of a visor incorporating the illuminated vanity mirror package of the present invention shown mounted to the passenger side of a vehicle.
Figure 2:
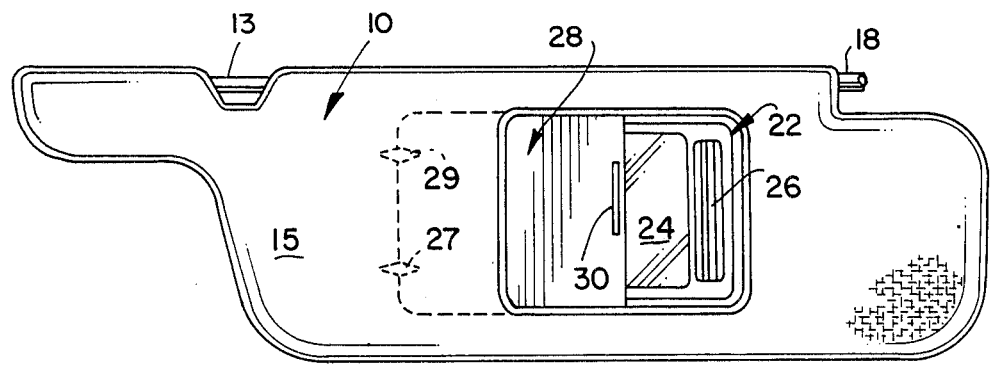
FIG. 2 is a front elevational view of the structure shown in FIG. 1, shown with the cover in a partially open position.
Figure 3:
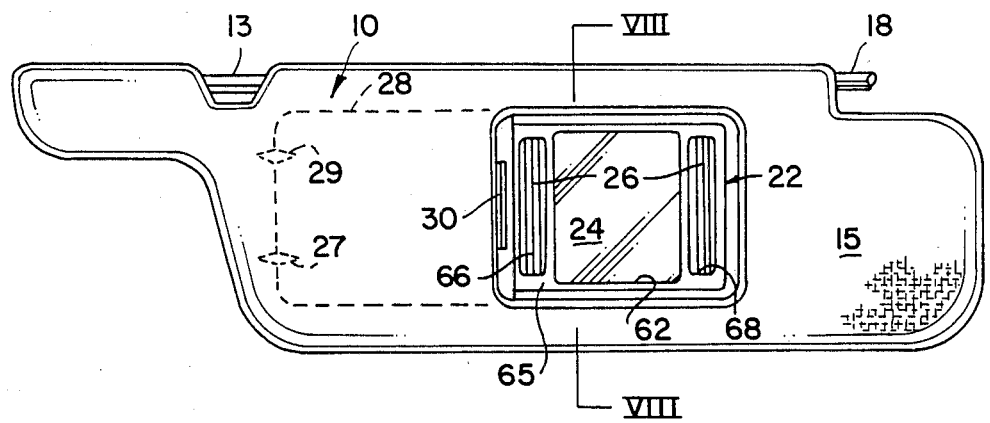
FIG. 3 is a front elevational view of the structure as shown in FIG. 1 shown with the cover in a fully open position.

In referring initially to FIGS. 1-3 there is shown a visor 10 embodying the vanity mirror insert package 20 of the present invention. In FIG. 1 the visor is shown mounted to the roof 12 of a vehicle such as an automobile and is shown in its lowered use position blocking a portion of the windshield 14. The visor is mounted to the roof of the vehicle by means of a pivot mounting bracket 16 which includes a visor pivot rod 18 which extends from within the body of the visor to permit the visor to move between the lowered use position illustrated and a raised, stored position against the vehicle roof 12. The pivot assembly 16 also permits the visor rod 18 to pivot therein for moving the visor from the front position illustrated to a side window position.

Visor 10 includes an end clip 13 which fits within a bracket (not shown) mounted to the vehicle roof near the top edge of the windshield to support an end of visor opposite pivot bracket 16. Visor 10 is made of a molded polymeric body 80 as described in greater detail below in connection with FIGS. 7 and 8 which is covered by a suitable upholstery material 15 to conform the visor's appearance to that of the vehicle's interior.

The vanity mirror package 20 includes a mirror frame assembly 22 for supporting a mirror 24 therein. Positioned adjacent opposite sides of the mirror frame are lenses 26 which direct illumination from lamps positioned within the visor body behind the lenses outwardly and inwardly from the plane of the visor to provide illumination in the front area of the mirror for use of the mirror under low ambient light conditions. The mirror frame assembly 22 supports a horizontally moveable sliding cover 28 which includes a small handle 30 extending adjacent the right edge thereof for movement of the sliding cover 28 between a closed position as shown in FIG. 1 to the open position shown in FIG. 3 passing through the intermediately open position as shown in FIG. 2.

Figure 4:
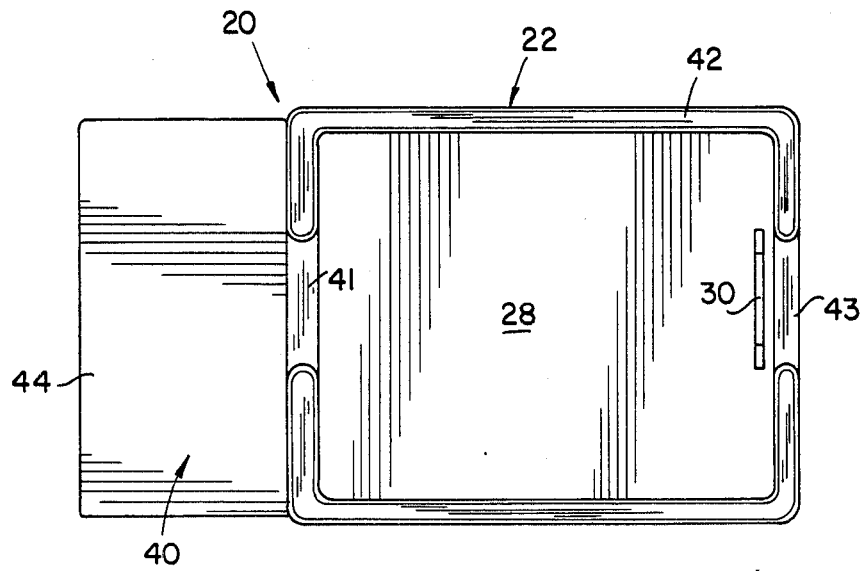
FIG. 4 is an enlarged front elevational view of the mirror insert package shown in FIGS. 1-3.
Figure 5:
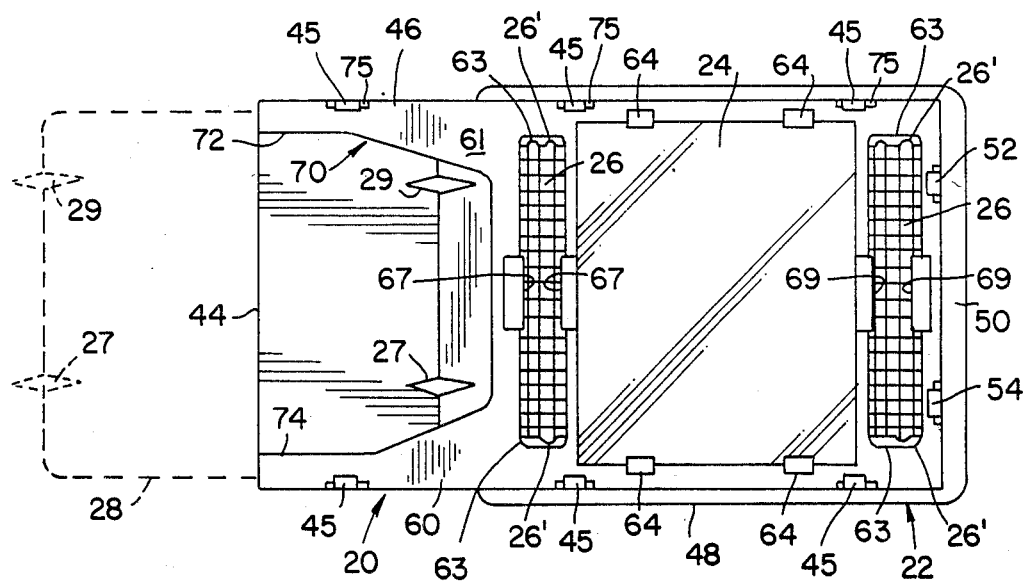
FIG. 5 is a rear elevational inverted view of the package shown in FIG. 4 with the cover shown in an open position in phantom form.
Figures 6, 8:
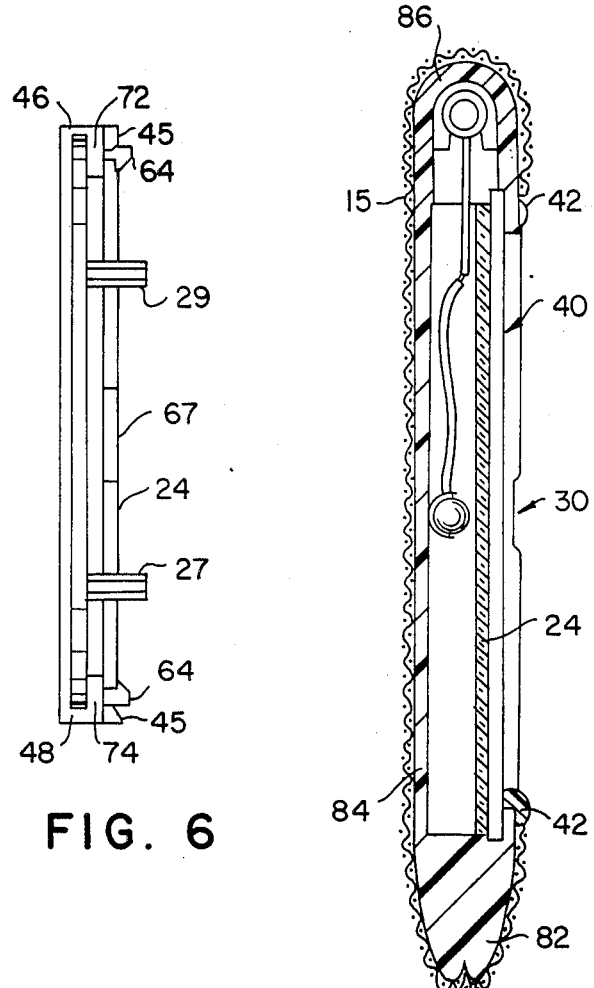
FIG. 6 is a left end elevational view of the structure shown in FIG. 5.
FIG. 8 is a cross-sectional view of the visor taken along section lines VIII—VIII of FIG. 3.

Referring now to FIGS. 4-6, it is seen that the illuminated covered vanity mirror insert package 20 comprises a three element assembly which comprises a front panel 40, a rear panel 60, and an intermediately positioned panel defining the sliding cover 28. Each of these elements are integrally molded of a suitable polymeric material such as polycarbonate and are subsequently snap-fitted together so that no separate fasteners are required for the assembled package illustrated in FIGS. 4 and 5. Insert 20 is then positioned within a pocket formed in the visor body as described below in connection with FIG. 7.

The front panel 40 includes a rectangular, decorative bezel 42 which includes recesses 41 and 43 on the opposite vertical legs thereof to provide access for handle 30 of cover 28. Integral with the bezel is a lateral panel 44 which extends from the left side of bezel 42 and serves the dual function of providing part of the guide and support means for the sliding cover 28 as well as secure the package 20 within the visor body. As best seen in FIGS. 5 and 6, the edge of panel 44 and the upper and lower legs of the rectangular bezel 42 include integral upper and lower sidewalls 46 and 48 which each include three spaced snap-lock tabs 45 for snap locking the front panel 40 and rear panel 60 together as illustrated in FIG. 5. Walls 46 and 48 loosely constrain the cover panel 28 therebetween such that it is free to slide between the walls 46 and 48.

Front panel 40 also includes a right end wall 50 (FIG. 5) integral with walls 46 and 48 and including outwardly projecting snap-lock tabs 52 and 54 which cooperate with slots in the recess formed in the visor body for snap-locking the right edge of the package 20 within the visor body. Wall 50, in addition to supporting tabs 52 and 54, serves as a stop for the right edge of cover 28. As best seen in FIG. 5, walls 46, 48 and wall 50 circumscribe three peripheral edges of the cover and are integral with bezel 42 and panel 44 and integrally include the snap locking tabs.

Figure 10:
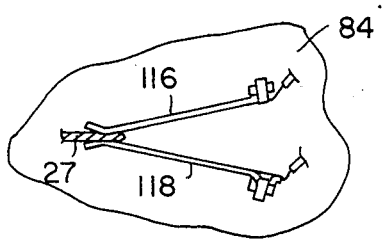
FIG. 10 is a fragmentary front elevational view partly in cross section illustrating the cooperation of the cover cam and switch means.

Cover 28 is a generally plane, rectangular cover panel having rounded corners and a pair of rearwardly and laterally extending switch actuating cams 27 and 29, each of which are generally wedge shaped with tapered walls terminating in narrowed opposite ends such that the cams 27 and 29 can separate a pair of switch contacts as illustrated in FIG. 10 when the cover is moved to a closed position as described below. A pair of switch actuating cams 27 and 29 are provided such that the switch controlled thereby can be selectively mounted in different locations in the visor body for left and right side visors for a vehicle.

Rear panel 60 forming the final element of assembly 20 includes a rectangular opening 62 (FIG. 3) somewhat smaller than the rectangular shape of mirror 24 such that the mirror can be seated in abutting relationship against and overlying opening 62 and held in place by peripheral locking tabs 64 (FIGS. 5 and 6) extending in spaced relationship along upper and lower edges of the mirror. Panel 60 further includes a pair of elongated rectangular apertures 66 and 68 (FIG. 3) behind which there is positioned lenses 26 which are held in place partly by pairs of locking tabs 67 and 69 with the innermost tab of each pair also butting against the vertical edge of mirror 24 such that the mirror 24 is held to the back surface 61 of panel 60 on each of its four edges. Apertures 66 and 68 each include upper and lower recesses 63 (FIG. 5) such that tabs 26' extending from the opposite ends of lenses 26 can be snap fitted into the recesses. The front surfaces of the lenses are faceted as shown in FIGS. 2 and 3 to direct light toward the area directly in front of and spaced from mirror 24. The recessed mounting of lenses 26 and mirror 24 prevent their obstruction of cover 28 as it is opened or closed.

Panel 60 also includes a bifurcated lateral extension 70 having upper and lower legs 72 and 74 which overlie the extension panel 44 on panel 40 to confine the cover and complete the generally U-shaped upper and lower guide channels of the guide and support means defined thereby as best seen in FIG. 6. The edges of panel 60 include a plurality of rectangular notches 75 (FIG. 5) for receiving the snap-lock tabs 45 when the panels are snap-locked together as shown in FIGS. 4-6. The spacing between the legs 72 and 74 permit the cams 27 and 29 to clear panel 60 such that cover 28 can be moved to a fully closed position as shown in FIGS. 4 and 5.

Figure 9:
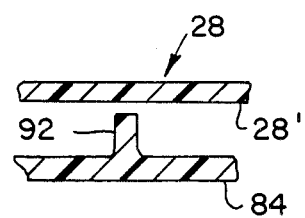
FIG. 9 is a fragmentary enlarged cross-sectional view of a portion of the visor assembly taken along section line IX—IX of FIG. 7.

The assembly 20 thereby provides a relatively compact and economical insert package made of three integrally molded elements including front panel 40, rear panel 60 and the sliding cover 28. It is assembled first by snapping the lenses 26 and mirror 24 to the rear panel 60 inserting the cover 28 within the guide channels defined by walls 46 and 48 of the front panel 40 and subsequently snap locking the front and rear panels 40 and 60 together by deflecting the resilient polymeric locking tabs 45. The package is then inserted into the pocket defining recess of the visor body which is now described in greater detail in conjunction with FIGS. 7-9.

Figure 7:
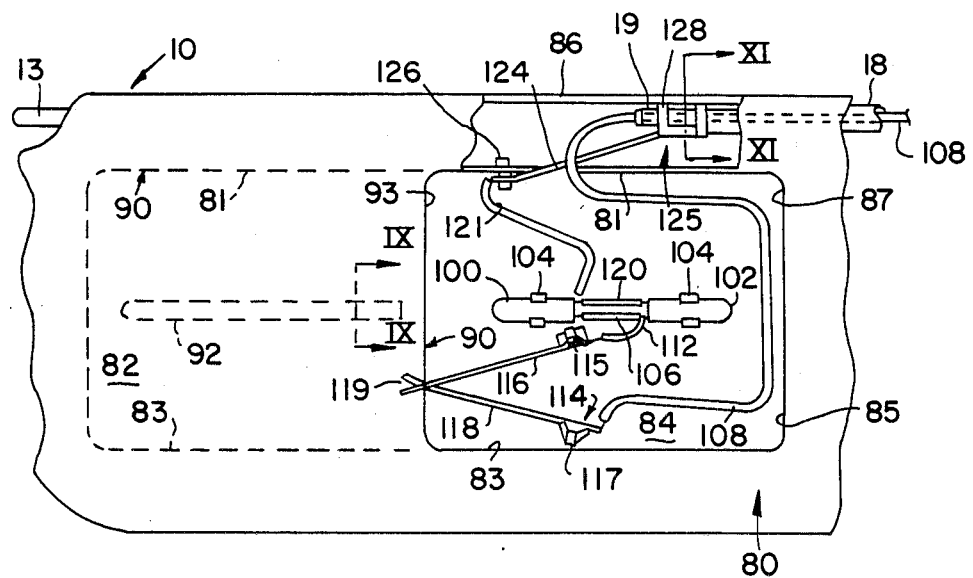
FIG. 7 is a fragmentary enlarged front elevational view of the visor shown in FIGS. 1-3 with the vanity mirror package removed.

Referring initially to FIG. 7, for the sake of clarity, the upholstery material has been deleted from the visor 10 to show the core 80 which is an integrally molded polypropylene core having a front panel 82 and a rear panel 84 integrally joined along the top edge by a hinge 86. As part of the pocket formed in the visor body for receiving package 20, panel 82 includes a rectangular aperture 85 which is about the size of bezel 42 which covers the peripheral edge of the package. The interior of the core is generally hollow, although suitable support ribs are positioned at several locations to add rigidity to the molded polymeric core. The core halves 82 and 84 include a laterally extending central recess communicating with the left side of aperture 85 for defining a pocket 90 extending to the left and under the front panel 82 as shown in phantom lines in FIG. 7. The visor body thus receives both the extension 44 of the front panel 40 as well as the adjoining legs 72 and 74 of the rear panel 60 and the pocket 90 is of sufficient length to receive the cover 28 when in an open position as illustrated in FIG. 5.

Extending centrally and longitudinally along the inner surface of rear wall 84 of core 80 is a upwardly extending guide rib 92 (FIGS. 7 and 9) which provides support along the horizontal centerline of cover 28 when moved to an open position to prevent the cover from deflecting into the visor body when in an open position. Guide rib 92 is spaced slightly away from the rear surface 28' of cover 28 so as not to inhibit the normal sliding action of the cover.

Extending between the front and rear inner surfaces of walls 82 and 84 defining the core are a pair of horizontally extending walls 81 and 83 which boarder the upper and lower edges of pocket 90 and aperture 85 while a wall 87 encloses the right end of pocket 90. Wall 87 includes a pair of spaced notches for receiving locking tabs 52 and 54 (FIG. 5) such that the right edge of the insert package 20 can be snap-locked into position within the visor body. The area of the recess in the visor core behind aperture 85 receives the illumination and switch means associated with the illuminated vanity mirror package 20 which is now described.

The illumination means includes a pair of horizontally spaced electrical lamps 100 and 102 mounted by conventional sockets and mounting clips 104. The lamps are coupled in parallel with the positive terminals of the lamps commonly coupled by a conductor 106 which in turn is coupled to a positive input conductor 108 from the vehicle's electrical system through the hollow pivot rod 18. Conductor 106 is coupled to conductor 108 by a conductor 112 and a serially coupled switch means 114 which is cam actuated by the movement of cover 28. Switch 114 in the preferred embodiment comprises a first electrical contact 116 and a second electrical contact 118, each of which are anchored to non-conductive panel 84 by brackets 115 and 117, respectively. Contact 116 and 118 are made of a beryllium copper and are stiffly resilient. The contacts 116 and 118 are positioned to be biased in a normally closed position as illustrated in FIG. 7. The tips 119 of the contacts are outwardly curved such that the cam 27 (FIGS. 5 and 10) can easily wedge between contacts 116 and 118 as the cover is closed to open the switch, thereby disconnecting lamps 100, 102 from the power supply conductor 108.

Figure 11:
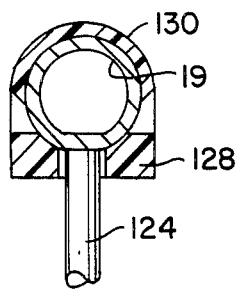
FIG. 11 is an enlarged cross-sectional view taken along section lines XI—XI of FIG. 7.

The ground conductor of each of the lamp sockets 104 are commonly coupled by a conductor 120 which is coupled via conductor 121 and another spring electrical leaf contact 124 secured to wall 81 by fastening means 126. Contact 124 selectively makes electrical contact with the metallic pivot rod 18 which is grounded by its coupling to the metallic roof of the vehicle by suitable fastening means typically through the pivot mounting bracket 16. As best seen in FIG. 11, contact 124 is restrained from motion into and out of the drawing plane of FIG. 7 by a U-shaped guide clip 128 made of an insulating material which however permits motion of the contact toward and away from the end 19 of rod 18. The end 19 of rod 18 includes, in the area of clip 128, a semi-cylindrical insulating sleeve 130 bonded to the upper one-half thereof such that, as the visor is pivoted upwardly toward a stored position against the roof of the vehicle, contact 124 rides over the insulating material 130, thereby disconnecting the ground connection of lamps to the vehicle ground. This switch thereby serves as a safety switch to insure that in the event that the cover is left open and the lamps illuminated when the visor is moved to a storage position, the lamps will be deactivated. The switch 125 defined by a contact 124 and sleeve 130 can be any type of visor motion responsive switch which opens when the visor is moved to a storage position. Thus, for example, a mercury switch could also be employed.

Thus, the lamp circuit defining the illumination means includes, in the preferred embodiment, a pair of switches 114 and 125, with switch 114 being responsive to the movement of the cover, therefore, activating the lamps 100 and 102 when the visor is lowered and the cover is in an open position for use of the mirror. Switch 125 insures the deactivation of the lamps when the visor is moved to a storage position regardless of the position of cover 28.

Once the vanity mirror insert package 20 is assembled as described above, the package is inserted into the pocket 90 by first inserting extension 44 of panel 40 under the lip 93 (FIG. 7) of panel 82 defining the left edge of aperture 85. The package is slid to the left until the frame bezel 42 aligns over aperture 85. The upholstery material may include flaps which extend inwardly of the peripheral edges of aperture 85 and as the package 20 is forced downwardly into the aperture 85, the fabric is pinned between the peripheral outer edges of walls 46, 48 and 50 against the edge of the aperture to provide a neat, trim appearance around the frame. The frame is pushed inwardly until tabs 52 and 54 lock within the tabs receiving notches formed in recess wall 87 to complete the assembly.

Thus, the system of the present invention provides a relatively inexpensive and compact illuminated vanity mirror package for use in visors and one which can be relatively easily assembled requiring a minimum of parts and assembly skill. Various modifications to the preferred embodiment of the invention described herein can be made by those skilled in the art without departing from the spirit or scope thereof as defined by the appended claims.

The embodiments of the invention in which an exclusive property or privilege is claimed are defined as follows:

1. A visor including a vanity mirror comprising:

a visor body having front and rear panels and a central recess extending into a side of said body, said recess defining an opening facing the interior of a vehicle in which the visor is mounted when the visor is in a lowered use position, said recess extending inwardly and laterally within said visor body to define a pocket between said panels for receiving at least a portion of a mirror assembly;

a mirror assembly mounted to said visor body within said recess, said assembly including a mirror frame and a mirror rigidly secured to said frame, a substantial portion of said mirror being exposed through said opening;

said recess extending a sufficient distance laterally of the mirror and frame for concealingly receiving a cover at least as large as that portion of the mirror exposed through said opening;

panel means coupled to a side of said mirror opposite said frame in spaced relationship to said frame whereby a cover can be received in a space between said frame and mirror, said panel means including an end extending to one side of said mirror and shaped to fit within said pocket in said visor body with said front panel overlying said end of said panel means for securing said mirror frame within said visor body; and a rigid cover slidably mounted with respect to said mirror frame for movement in said space along a plane parallel to and in front of said mirror, said cover movable between a first position covering said mirror and a second position within said recess to one side of and forwardly of said mirror for uncovering said mirror.

2. The apparatus as defined in claim 1, wherein said mirror frame further includes at least one locking tab extending from said frame in a direction opposite said end of panel means for locking said mirror frame in place in said visor body.

3. The apparatus as defined in claim 1, wherein said panel means and said frame include guide means extending adjacent opposite edges of said mirror, and wherein said cover is slidably mounted to said frame within said guide means for movement from said first position covering said mirror to a second position uncovering said mirror and wherein at least a portion of said guide means extends within said pocket of said visor body.

4. The apparatus as defined in claim 3 and further including illumination means mounted to said visor and including switch means actuated by said cover to provide illumination for use of said mirror in low ambient light when said cover is moved to said second position.

5. The apparatus as defined in claim 4, wherein said mirror frame and said panel means are snap-fitted together.

6. The apparatus as defined in claim 5, wherein each of said mirror frame, said panel means and said cover are molded of a polymeric material.

7. A visor including a vanity mirror comprising:
a visor body having a central recess extending into a side of said body facing the interior of a vehicle in which the visor is mounted when the visor is in a lowered use position, said recess extending inwardly and laterally within said visor body to define a pocket for receiving at least a portion of a mirror assembly;
a mirror assembly mounted to said visor body within said recess, said assembly including a mirror frame and a mirror mounted to said frame, said frame further including lateral panel means extending to one side of said mirror, said lateral panel shaped to fit within said pocket in said visor body for securing said mirror frame within said visor body, wherein said lateral panel and said frame include guide means extending adjacent opposite edges of said mirror, and wherein said assembly further includes a molded polymeric cover slidably mounted to said frame within said guide means for movement from a first position covering said mirror to a second position uncovering said mirror, wherein said mirror frame comprises two molded polymeric panels snap-fitted together and having said cover positioned therebetween and at least a portion of said guide means extends within said pocket of said visor body, and wherein said guide means comprises channels defined by said panels when fitted together, said channels extending along opposite edges of said cover in the direction of movement of said cover; and
illumination means mounted to said visor and including switch means actuated by said cover to provide illumination for use of said mirror in low ambient light when said cover is moved to said second position.

8. A covered vanity mirror package for mounting to a vehicle visor comprising:
a generally rectangular bezel defining an opening for viewing a mirror mounted behind said bezel;
a mirror panel including a mirror mounted thereto, wherein said mirror panel and said bezel include interlocking means for snap-fitting said bezel and panel together, said panel and bezel when fitted together defining guide means extending adjacent opposite edges of said mirror and between said bezel and panel;
a sliding cover positioned on said guide means between said bezel and said panel and movable between a first position covering said mirror to second position uncovering said mirror; and
means for mounting said mirror panel and bezel to a visor.

9. The apparatus as defined in claim 8, wherein said panel further includes light transmissive means adjacent said mirror for directing illumination from a lamp in the visor body outwardly through said panel and opening of said bezel for use of said mirror in low ambient light conditions.

10. The apparatus as defined in claim 9, wherein said light transmissive means comprises at least one lens.

11. The apparatus as defined in claim 8, wherein said means for mounting said mirror panel and bezel to a visor includes a lateral panel means integral with at least one of said bezel or mirror panel and extending laterally from an edge of said mirror adjacent said opposite edges thereof.

12. The apparatus as defined in claim 15, wherein said means for mounting said mirror panel and bezel to a visor further include tab means extending from at least one of said bezel or mirror panel from a side opposite said lateral panel for snap-locking said covered vanity mirror package to a visor.

13. An illuminated vanity mirror visor comprising:
a visor body including recess means for a vanity mirror;
a mirror frame including a pair of lenses adjacent opposite edges of said mirror for providing illumination for use of said mirror,
means for mounting said mirror frame to said visor body;
a cover slidably mounted with respect to said mirror frame for movement in a plane parallel to and in front of said mirror, said cover movable between a first position covering said mirror and a second position uncovering said mirror; and
switch means mounted to cooperate with said cover for activating said illumination means when said cover is moved from said first position, wherein said switch means includes a pair of normally closed contacts and said cover includes cam means engaging at least one of said contacts to open said contacts when said cover is in said first position to deactivate said illumination means.

14. The visor as defined in claim 13, wherein said visor includes a pivot rod for moving said visor between a raised stored position and a lowered use position, and wherein said switch means further includes second switch contacts mounted to be selectively activated by said pivot rod as said visor is moved, said illumination means including lamp means coupled to said second switch contacts, said second switch contacts coupled in series with said first named switch contacts to assure said lamp means is deactivated when said visor is moved to a raised position.

* * * * *

UNITED STATES PATENT AND TRADEMARK OFFICE
CERTIFICATE OF CORRECTION

PATENT NO. : 4,648,011

DATED : March 3, 1987

INVENTOR(S) : Carey J. Boote, Craig Robbins and Scott A. Spykerman

It is certified that error appears in the above-identified patent and that said Letters Patent is hereby corrected as shown below:

Column 4, line 47:

"a" should be --an--

Column 8, claim 12, line 19:

"claim 15" should be --claim 11--

Signed and Sealed this

Twenty-second Day of September, 1987

Attest:

DONALD J. QUIGG

Attesting Officer

Commissioner of Patents and Trademarks